(12) United States Patent
Chatow et al.

(10) Patent No.: US 7,927,409 B2
(45) Date of Patent: Apr. 19, 2011

(54) MULTI-COLORED IMAGES VIEWABLE UNDER NON-VISIBLE RADIATION

(75) Inventors: Udi Chatow, Palo Alto, CA (US); Gal Victor, Rehovot (IL); Galia Golodetz, Rehovot (IL); Edna Mannheim, Jerusalem (IL); Kok-Wei Koh, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1061 days.

(21) Appl. No.: 11/726,937

(22) Filed: Mar. 23, 2007

(65) Prior Publication Data

US 2008/0233313 A1 Sep. 25, 2008

(51) Int. Cl.
*C09D 11/00* (2006.01)

(52) U.S. Cl. .................. 106/31.27; 106/31.6; 106/31.64

(58) Field of Classification Search ............... 106/31.27, 106/31.6, 31.32, 31.64; 252/301.36, 301.33
See application file for complete search history.

(56) References Cited

U.S. PATENT DOCUMENTS

| | | | |
|---|---|---|---|
| 5,083,814 A | 1/1992 | Guinta et al. | |
| 5,547,501 A | 8/1996 | Maruyama et al. | |
| 5,569,317 A | 10/1996 | Sarada et al. | |
| 5,683,843 A | 11/1997 | Nohr | |
| 6,138,913 A | 10/2000 | Cyr et al. | |
| 6,143,470 A | 11/2000 | Nguyen et al. | |
| 6,369,844 B1 | 4/2002 | Neumann | |
| 6,793,723 B2 * | 9/2004 | Auslander et al. | 106/31.32 |
| 6,827,769 B2 * | 12/2004 | Auslander et al. | 106/31.32 |
| 7,075,703 B2 | 7/2006 | O'Neil et al. | |
| 7,087,354 B2 | 8/2006 | Nakamura et al. | |
| 2004/0256974 A1 * | 12/2004 | Mueller-Mach et al. | 313/485 |
| 2005/0157111 A1 | 7/2005 | Silverbrook | |
| 2005/0279247 A1 * | 12/2005 | Auslander et al. | 106/31.28 |
| 2005/0279248 A1 * | 12/2005 | Auslander | 106/31.28 |
| 2006/0078673 A1 | 4/2006 | Ripstein | |

FOREIGN PATENT DOCUMENTS

WO 95/04955 A1 2/1995

* cited by examiner

*Primary Examiner* — Jerry Lorengo
*Assistant Examiner* — Veronica Faison Gee

(57) ABSTRACT

A set of colorants for printing a multi-colored image when viewed under non-visible radiation outside of the visible spectrum can include a first colorant and a second colorant. The first colorant can be capable of absorbing non-visible radiation and shifting the wavelength of the non-visible radiation to a visible wavelength, thus producing a visible color. Likewise, the second colorant can be capable of absorbing the non-visible radiation and shifting the wavelength to a second visible wavelength, thus producing a different visible color.

13 Claims, No Drawings

MULTI-COLORED IMAGES VIEWABLE UNDER NON-VISIBLE RADIATION

BACKGROUND OF THE INVENTION

For some time, there has been a desire to produce systems and methods that can offer a greater degree of document security. For example, documents often need to be marked as original, such as identification cards, passports, checks, and currency. For this purpose, specialized watermarks and printing techniques have been developed. Additionally, a variety of printing materials have been incorporated into such processes. Counterfeiting continues to advance along with the developments in providing more authentic and secure documents. Thus, there is a need to develop more techniques and materials which impart new and additional levels of authentication to documents and the like.

DETAILED DESCRIPTION OF THE PREFERRED EMBODIMENT(S)

Reference will now be made to the exemplary embodiments of the present invention, both those described and those illustrated in the drawing, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing and claiming the present invention, the following terminology will be used.

The singular forms "a," "an," and "the" include plural referents unless the context clearly dictates otherwise. Thus, for example, reference to "a colorant" includes reference to one or more colorants.

As used herein, when referring to "colorant-containing fluids," this encompasses liquid toners, inks such as ink-jet inks, colorant-containing slurries, and other liquids that include at least one colorant in accordance with embodiments of the present invention. The term "fluid" does not require that all components in the composition be liquid, as pigments are typically dispersed in the color-containing fluid. Thus, fluid dispersions and fluid solutions are both included as colorant-containing fluids. It is also noted that the term "colorant" in many embodiments includes materials that receive light outside of the visible spectrum, and reflect light within the visible spectrum.

As used herein, the term "hue" refers to a color within the visible spectrum. Both "hue" and "color" are used to indicate distinct colors. Technically, two different hues are distinguished as light is emitted or reflected from one hue at a wavelength that is different from a wavelength of the other hue. To go further, in accordance with embodiments of the present invention, this difference can be perceptively different to an ordinary viewer. Examples would include a perceived difference in yellow versus green or red verses blue. Colors can be defined by wavelength ranges associated with them: violet is 380-450 nm, blue is 450-495 nm, green is 495-570 nm, yellow is 570-590 nm, orange is 590-620 nm, and red is 620-750 nm. As used herein, a green of 496 nm and a blue of 494 nm would not be considered different hues as, although they are technically different wavelengths and even different colors as defined by their associated wavelengths, they would not likely be perceptively distinguishable by an ordinary or casual viewer as different colors or hues, whereas a mid range violet and a mid range blue would likely be perceptibly distinguishable.

The term "non-visible radiation" refers to all radiation outside of the visible light spectrum. As the visible light spectrum is typically defined as including all wavelengths from about 380 nm to about 750 nm, any wavelength of energy above or below the range is non-visible radiation. Non-visible radiation includes "IR" or "infrared" and "UV" or "ultra violet". Infrared radiation is that radiation with a wavelength greater than visible light. Specifically, IR includes radiation ranging from about 750 nm to about 1 mm. Conversely, ultra violet radiation is that radiation with a wavelength shorter than that of visible light. Typically, UV is defined as radiation with a wavelength ranging from about 1 nm to about 380 nm. UV radiation can be sub-divided into long wave or "blacklight" (about 315 nm to about or slightly greater than 380 nm), medium wave (about 280 to about 315 nm), and short wave (less than about 280 nm).

Additionally, as discussed herein, exposing a media, colorant, or colorant-containing fluid to non-visible radiation is meant to indicate exposure at a greater level to the non-visible radiation than is typically found in ambient light. For example, bringing the colorants or media near a black light is included in exposing the colorants or media to non-visible radiation. For example, taking the colorants or media into the sunlight is not considered exposing the colorants or media to non-visible radiation, even though sunlight includes non-visible radiation.

The colorants are said to absorb non-visible radiation and shift the wavelength of the non-visible radiation to a visible wavelength. Although this is the terminology used to explain the phenomena of exciting a colorant with non-visible energy and having the colorant emit a visible wavelength, it is understood that other explanations or descriptions are equally as probable and/or valid so long as it indicates that the colorant receives non-visible wavelength and, as a result, emits or reflects visible wavelength energy. For example, it could be said that the colorants absorb non-visible radiation and emit a visible wavelength. Further, the colorants could be said to fluoresce or phosphorese a visible color upon being exposed to non-visible radiation.

The terms "light" and "radiation" can be used interchangeably.

The term "about" when referring to a numerical value or range is intended to encompass the values resulting from experimental error or differences in perception that can occur when taking measurements.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

According to various aspects of the present invention, a set of colorants for printing or rendering a multi-colored image when viewed under light outside of the visible spectrum can include a first colorant and a second colorant. The first colorant can be capable of absorbing non-visible radiation and shifting the wavelength of the radiation to a first visible wavelength. The visible wavelength can produce a first hue. Likewise, the second colorant can be capable of absorbing non-visible radiation and shifting the wavelength of the radiation to a second visible wavelength. The second visible wavelength can produce a second hue, which is different from the first hue. In one aspect, the first colorant and/or the second colorant can be a pigment. In accordance with the present invention, the non-visible radiation can be ultra violet radiation. Alternatively, the non-visible radiation can be infrared. In one aspect, the set of colorants can be included in a colorant-containing fluid for printing, e.g., multiple inks, multiple liquid toners, etc.

The described set of colorants can be used to produce multi-colored images which are activated under a type of energy not previously used to produce such multi-colored images. Some advanced authentication documents have been known to use a monochrome image that is activated when exposed to ultra violet light, but creating a multi-colored image (i.e. an image using two or more colors in combination) allows for many more advanced designs and application. For example, the multi-colored image can even be full-color image, similar to a typical full-color image perceived in visible light, which can be translated from non-visible light to a perceptibly red, green and blue combination. There are many combinations of colors that can produce perceptibly full-colored images under non-visible radiation. In one embodiment, red, green and blue can be used in combination, in another embodiment, any three colorant-containing fluids that can be used in combination to produce a full-colored image can be used (e.g. orange, violet and turquoise). Such a combination can be printed or rendered with colorants that absorb non-visible radiation and shift the wavelength to the visible spectrum. As such, in one aspect, at least one of the first visible wavelength and the second visible wavelength can be red, green, or blue. In a further aspect, both the first visible wavelength and the second visible wavelength can be independently selected from red, green, or blue, where the first visible wavelength and the second visible wavelength are different hues, meaning both wavelengths cannot be red.

As with other sets of colorants, the set can include additional colorants. In one aspect, the colorant set can include a third colorant capable of absorbing the non-visible radiation and shifting the wavelength to a third visible wavelength. The third visible wavelength can be a different hue from either or both of the first visible wavelength or the second visible wavelength. In a red-green-blue (RGB) system, each of the three colorants can emit one of the RGB colors. The red-green-blue combination can then be printed together to create full-color images. Regarding the colorant set, for example, the first visible wavelength can be red, the second visible wavelength can be green, and the third visible wavelength can be blue. With this colorant set, the colorants can combine to emit a perceptibly full-color image under the non-visible radiation. For example, all of red, green, and blue can be perceived in a full-colored image when exposed to a common source of non-visible radiation.

To create an image, the colorants can be included in a variety of vehicles or used in various ways. In a particular embodiment, inks and/or liquid toners having colorants capable of absorbing non-visible radiation and shifting the wavelength to a visible wavelength can be applied to some type of media, e.g., coated media sheets, transparencies, etc. One method of applying the colorant-containing fluids to media can be ink-jet printing. Another method includes applying the colorant-containing fluid as a toner composition, such as a liquid toner composition, as dry toner, etc. Notwithstanding the above, applications for printing include ink-jet printing, electrophotography, liquid electrophotography, dye sublimation, analog offset, Indigo printing, or reflective e-paper applications. It should be understood that any use of the colorant set described herein is practical, though for ease of discussion, much of the teachings herein is directed to colorant-containing fluid printing, such as printing with inks and toners.

As such, the first colorant-containing fluid, the second colorant-containing fluid, and any additional colorant-containing fluids can be formulated for ink-jet or toner printing. In one embodiment, the set of colorants can include a colorant which reflects visible light radiation to produce a visible light-reflected hue, as is more traditional for printing applications. This colorant-containing fluid(s) can be separate from the colorant-containing fluids containing the colorant that reflects non-visible radiation in the visible spectrum. Alternatively, the set of colorants can include both standard colorants and colorants that reflect non-visible radiation in the visible spectrum. The colorant that reflects visible light radiation and produces a visible light-reflected hue, if present in the colorant-containing fluid set, can be a dye or a pigment. Additionally, as is conventional in the more traditional ink fields that reflect visible light, the visible light-reflected hues that can be used include cyan, magenta, yellow, and/or black. Other colors such as pink, orange, red, violet, blue, etc., can also be used.

Sets of colorants described herein can be utilized to produce colored images that are activated by non-visible radiation. Accordingly, a method for printing a multi-colored image onto a media when viewed under light outside of the visible spectrum can include printing on the media a first colorant that is capable of absorbing non-visible radiation and shifting the wavelength to a first visible wavelength. The method can additionally include printing on the media a second colorant capable of absorbing the non-visible radiation and shifting the wavelength of the radiation to a second visible wavelength. The first visible wavelength and the second visible wavelength can be different hues.

To print a more advanced image, the method can further include printing on the media a third colorant capable of absorbing the non-visible radiation and shifting the wavelength to a third visible wavelength such that the third visible wavelength is a different hue from the first and second visible wavelengths. As with the colorant sets, the first visible wavelength can be red, the second green, and the third blue. These three visible wavelengths can combine to emit a perceptibly full color image under the non-visible radiation.

In addition to printing on the media, two colorants capable of absorbing non-visible radiation and shifting the wavelength of the non-visible radiation to different visible wavelengths, the method for printing a colored image can further include printing an image on the media with a colorant-containing fluid including a colorant that reflects visible light radiation to produce a visible light-reflected image. Such colorant-containing fluids that reflect visible light radiation are known in the printing industry and can include dye or pigment as colorant.

Thus, it is possible to create an image that can absorb two different types of non-visible radiation. For example, an image having at least two colors can be printed such that when exposed to a first non-visible radiation, an image appears in the visible spectrum. Further, when exposed to a second non-visible radiation, the colorants in the colorant-containing fluid reflect an alternative visible wavelength to show an image. The first non-visible radiation can be UV light and the second non-visible radiation can be IR light, or vice versa. Alternatively, the first and second non-visible light can be two different UV wavelengths, or of two different IR wavelengths. Alternatively, an image can be printed to appear red under ambient light, and appear a different color under non-visible radiation, or remain red under non-visible radiation.

These and other concepts may be better understood through example. Onto a print media, an image using conventional colorant-containing fluid(s), such as inks or toner compositions, can be printed. This image, referred to as A, absorbs and reflects visible light radiation. The image A can be monochrome (including black and white), or can include more than one color. A second image can be printed on the same media (or fully or partially over or under the same image). The image B can absorb ultraviolet light and shift the wavelength to produce a multi-colored image including at least two hues. In one aspect, the image may include two colorants that absorb the ultraviolet radiation and emit in the visible spectrum. Further, the image may include three or more colorants that absorb the ultraviolet radiation and emit in the visible spectrum at different hues. It should be noted in the example, though, that the infrared radiation and the ultra violet radiation can be switched. Further, another image, C, can be printed on the same media (or fully or partially over or under the same image). The image C can absorb infrared radiation and shift the wavelength of the radiation to emit in the visible spectrum. The image C can be monochrome or include more than one color. Thus, under standard lighting, an observer would see image A. Depending on the colorant-containing fluids used and type of lighting, minor distortions or variations in image quality may be observable due to the presence of images B and C, however such distortion or image quality should be minimal. Further, it is noted that images B and C can be optionally superimposed with image A in any manner desired (i.e. B over A, A over C, B and C over A, etc.). Next, the image can be exposed to ultra violet radiation, perhaps in the form of a black light, along with visible light. Such exposure would produce a visual image of A and B to an observer. Alternatively, exposure only to ultra violet radiation would produce a single image B. Image C, however, can be observed when the media is exposed to infrared radiation. Image C can be monochrome, or can be full-colored, or any variation there between. As with the ultra violet radiation, exposure to infrared radiation and visible light radiation would produce the combined image of A and C, whereas exposure only to infrared radiation would produce image C only. To go further, exposure to visible light, ultra violet, and infrared would produce the composite image of A, B and C, as visible in the visible light spectrum. In some cases, one, two or even all three images can be full-color images. Technology of this nature would allow for identification cards and perhaps bank and credit cards to move from having only a monochrome watermark design that is visible in ultraviolet light to perhaps having a full color image such as a picture of a landscape or of the individual who owns the card.

Accordingly, a method for printing a colored image can further include printing a colorant capable of absorbing a second non-visible radiation and shifting the wavelength of the second non-visible radiation to reflect a visible wavelength.

The images produced herein with a first image responsive only to visible radiation and a second image with at least two colorants that absorb non-visible radiation and reflect at least two different hues in the visible spectrum, both images on the same media, can be used for a variety of purposes. As discussed, such imaging can be very beneficial as a security or authentication tool. The second image can provide additional information (e.g. color identification picture), can alter the first image, or can provide authentication merely by its presence. Applications of this technology do not end with security, though. Printing and the resulting images of this type can be used to produce unique versions of any printed material. In one aspect, the image can be used as a game or part of a game, such as a children's game piece (e.g. with secret decoding aspects), or with other game-types (e.g. lottery tickets). Further, such images can be useful in décor as with posters and artwork.

Any colorant capable of absorbing non-visible radiation and emitting a visible wavelength can be included in the colorant-containing fluids carrying the set of colorants described herein. Example colorants include ultra violet pigments and infrared pigments. Non-limiting examples of ultra-violet pigments include Invisible Red S, Invisible Blue S, Invisible Cyan S, Invisible Blue E, Invisible Red E, Invisible Red R, Invisible Green R, and Invisible Blue R (from Glowbug); ADA4604, ADA4619, ADA4605, ADA4607, ADA4628, and ADA4625 (from H. W. Sands Corp.); IPO-19, IPO-18, and IPO-13 (from DayGlo Color Corp.); SPF-0008, SPF-0013, SPF-0018, SPF-1100, SPF-1200, SPF-1300, SPF-1400, SPF-1800, SPF-1900, SPF-2300, SPF-2100, SPF-2800, and SPF-3100 (from Spectra); Pigment UVR, and Pigment UVG (from StarDust Materials); and Blue CD164, Blue CD165, Green CD163, Green CD145, Red CD106, Red CD105, and Red CD120 (from Honeywell). Non-limiting examples of infrared pigments include UC-1 (from Glowbug); ADB5350, ADB8800, and ADB4888 (from H.W. Sands Corp.), and Pigment Z, Pigment K, and Pigment S (from StarDust Materials).

These colorants can be visually imperceptible (substantially invisible) under ambient light, or can have color under ambient light, but which have a different color when exposed to non-visible radiation. Further, more standard colorants can be added to the colorant-containing fluids of the present invention if the desire is to provide some color property to the colorant-containing fluid. For example, a small amount of standard colorant (pigment or dye) can be added to a colorant-containing fluid so that it is at least nominally visible when printed on media to ensure that the colorant-containing fluid has indeed been printed. Alternatively, a larger amount of colorant can be used if the desire is to give a colorant-containing fluid a first color which is perceptibly different under non-visible radiation.

Regarding the liquid vehicles and other additives that can be included in the formulations and methods of present invention, it is understood that the enumerated components are exemplary and do not limit the scope of vehicle components that can be used. For example, the liquid carrier and a resin can be mixed to form a slurry. The carrier liquid can include, but is not limited to, an insulating, nonpolar liquid that is used as the medium for toner particles. The carrier liquid can include compounds that have a resistivity in excess of about $10^9$ ohm-cm and a dielectric constant below about 3.0. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, or aromatic hydrocarbons.

Illustrative carrier liquids include, but are not limited to, Isopar-G™, Isopar-H™, Isopar-L™, Isopar-M™, Isopar-K™, Isopar-V™, Norpar 12™, Norpar 13™. and Norpar 15™, Exxo1D40™, Exxo1D80™, Exxo1D100™, Exxo1D130™, and Exxo1D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and electron, positron, or new II, purogen HF (100% synthetic terpenes) (sold by ECOLINK).

The resin can include, but is not limited to, thermoplastic toner resins. In particular, the resin can include, but is not limited to, ethylene acid copolymers; ethylene acrylic acid copolymers; methacrylic acid copolymers; ethylene vinyl acetate copolymers; copolymers of ethylene (80 to 99.9%), acrylic or methacrylic acid (20 to 0.1%)/alkyl (C1 to C5) ester of methacrylic or acrylic acid (0.1 to 20%); polyethylene; polystyrene; isotactic polypropylene (crystalline); ethylene ethyl acrylate, polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid wherein alkyl is from 1 to about 20 carbon atoms, like methyl methacrylate (50 to 90%)/methacrytic acid (0 to 20 percent/ethylhexylacrylate (10 to 50%)); Ethylene-Acrylate terpolymers: Ethylene-Acrylic esters-Maleic Anhydride (MAH) or Glycidyl Methacrylate (GMA) terpolymers; low molecular weight Ethylene-Acrylic Acid ionomers and combinations thereof. In an embodiment, the toner can include the Nucrel family of toners (e.g., Nucrel 403™, Nucrel 407™, Nucrel 609HS™, Nucrel 908HS™, Nucrel 1202HC™, Nucrel 30707™, Nucrel 1214™, Nucrel 903™Nucrel 3990™, Nucrel 910™, Nucrel 925™, Nucrel 699™, Nucrel 599™, Nucrel 960™, Nucrel RX 76™, Nucrel 2806™, Bynell™ 2002, Bynell™ 2014, Bynell™ 2020. (sold by E. I. du PONT)). Aclyn family (e.g. Aclyn 201, Aclyn 246, Aclyn 285, Aclyn 295, Lotader family (e.g. Lotader 2210, Lotader, 3430, or Lotader 8200 (sold by Arkema)).

The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, divalent metal carboxylates and trivalent metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), hydroxy bis(3,5-di-tert-butyl salicylic)aluminate monohydrate, and a mixture of hydroxy bis (3,5-di-tert-butyl salicylic)aluminate monohydrate. In an embodiment, the charge adjuvant can be aluminum tristearate.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of UV Red Colorant-Containing Fluid

A mixture is prepared including:

| | |
|---|---|
| Isopar-L (carrier) | 60-85 wt % |
| Nucrel 699 (resin) | 15-40 wt % |
| ACE 5120 (resin) | 0-20 wt % |

The ingredients are mixed and heated to a temperature from about 120° C. to about 160° C. This produces a slurry that is about 50-90 wt % solids. To the mixture, aluminum tristearate (a charge adjuvant) is added at an amount of about 1-5 wt % by total weight of solids. Additionally, Invisible Red S pigment (by Glowbug) is added at an amount of 2.5-60 wt % by total weight of solids. Additional Isopar-L can be added to adjust the viscosity of the slurry, and the mixture can be grinded.

Example 2

Preparation of UV Green Colorant-Containing Fluid

The same procedure as Example 1 is followed, except SC4 pigment (from Angstrom) is used in place of Invisible Red S pigment.

Example 3

Preparation of UV Blue Colorant-Containing Fluid

The same procedure as Example 1 is followed, except SC11 pigment (from Angstrom) is used in place of Invisible Red S pigment.

Example 4

Preparation of UV Red Colorant-Containing Fluid

In an illustrative embodiment, a toner including an UV fluorescent pigment may be prepared by preparing a mixture of a carrier liquid such as Isopar-L™ (about 60%-85%, by total weight), a resin such as Bynell™ 2022 (about 15%-40%, by total weight). The ingredients are mixed in a double planetary mixer, for example a Ross mixer, for about 1.5 hours at a temperature between about 120° C. to about 160° C. to produce a slurry of the carrier and polymer particles plasticized by solvation of the liquid carrier. The mixing is then continued for another 1.5 hours while the mixture cools down to room temperature. The slurry (about 50%-90%, by total weight of solids) is then added to a 750 ml attritor (e.g. a Union Process™ MODEL 01-HD ATTRITOR) together with a charge adjuvant like aluminum tristearate (about 1%-5%, by total weight of solids) and Invisible Red R(fine) T pigment (about 2.5%-60%, by total weight of solids). Isopar-L™ can be added to adjust the viscosity of the slurry. The slurry is grinded for 6 hours at about 50° C.-60° C. at about 700 RPM. Then the attritor is stopped and removed. This gives a UV red fluorescent toner composition.

Example 5

Preparation of IR Red Colorant-Containing Fluid

In an illustrative embodiment, a toner including an IR fluorescent pigment may be prepared by preparing a mixture of a carrier liquid such as Isopar-L™ (about 60%-85%, by total weight), a resin such as Nucrel™ 699 (about 15%-40%, by total weight) and a resin such as ACE 5120 (about 0%-20%, by total weight). The ingredients are mixed in a double planetary mixer, for example a Ross mixer, for about 1.5 hours at a temperature between about 120° C. to about 160° C. to produce a slurry of the carrier and polymer particles plasticized by solvation of the liquid carrier. The mixing is then continued for another 1.5 hours while the mixture cools down to room temperature. The slurry (about 50%-90%, by total weight of solids) is then added to a 750 ml attritor (e.g. a Union Process™ MODEL 01-HD ATTRITOR) together with a charge adjuvant like aluminum tristearate (about 1%-5%, by total weight of solids). Isopar-L™ can be added to adjust the viscosity of the slurry. The slurry is grinded for 5 hours at about 50° C.-60° C. at about 700 RPM. After this the RPM is lowered to about 50 RPM and a pigment such as ADB8800™ (about 2.5%-60%, by total weight of solids) is added to the slurry. The slurry mixed for several minutes until the pigment is completely absorbed in the slurry. After absorption the RPM is raised to about 700 and cooling begins immediately to bring the temperature to about 25° C.-35° C. The slurry is left to mix for about 30 minutes and then the attritor is stopped and toner is removed. This gives an IR Red fluorescent toner composition.

Example 6

Preparation of UV Blue Colorant-Containing Fluid

In an illustrative embodiment, a toner including an UV fluorescent pigment may be prepared by preparing a mixture of a carrier liquid such as Isopar-L™ (about 60%-85%, by total weight), a resin such as Nucrel™ 699 (about 15%-40%, by total weight). The ingredients are mixed in a double planetary mixer, for example a Ross mixer, for about 1.5 hours at a temperature between about 120° C. to about 160° C. to produce a slurry of the carrier and polymer particles plasticized by solvation of the liquid carrier. The mixing is then continued for another 1.5 hours while the mixture cools down to room temperature. The slurry (about 50%-90%, by total weight of solids) is then added to a 750 ml attritor (e.g. a Union Process™ MODEL 01-HD ATTRITOR) together with a charge adjuvant like aluminum tristearate (about 1%-5%, by total weight of solids) and a C09™ pigment (about 2.5%-60%, by total weight of solids). Isopar-L™ can be added to adjust the viscosity of the slurry. The slurry is grinded for 6 hours at about 50° C.-60° C. at about 700 RPM. Then, the attritor is stopped and removed. This gives a UV Blue fluorescent toner composition.

Example 7

Preparation of UV Blue Colorant-Containing Fluid

In an illustrative embodiment, a toner including an UV fluorescent pigment may be prepared by preparing a mixture of a carrier liquid such as Isopar-L™ (about 60%-85%, by total weight), a resin such as Nucrel™ 699 (about 15%-40%, by total weight). The ingredients are mixed in a double planetary mixer, for example a Ross mixer, for about 1.5 hours at a temperature between about 120° C. to about 160° C. to produce a slurry of the carrier and polymer particles plasticized by solvation of the liquid carrier. The mixing is then continued for another 1.5 hours while the mixture cools down to room temperature. The slurry (about 50%-90%, by total weight of solids) is then added to a 750 ml attritor (e.g. a Union Process™ MODEL 01-HD ATTRITOR) together with a charge adjuvant like aluminum tristearate (about 1%-5%, by total weight of solids) and a SC17™ pigment (about 2.5%-60%, by total weight of solids). Isopar-L™ can be added to adjust the viscosity of the slurry. The slurry is grinded for 6 hours at about 50° C.-60° C. at about 700 RPM. Then the attritor is stopped and removed. This gives a UV Blue fluorescent toner composition.

Example 8

Colorant-Containing Fluid Sets

The colorant-containing fluids of Example 1, Example 2, and Example 3 are included in an ink-set, in accordance with the present invention.

Example 9

Non-Visible and Visible Colorant-Containing Fluid Sets

The set of colorants in the colorant-containing fluids of Example 8 are combined with a standard cyan, magenta, yellow, and optionally black colored fluids, so that full color images viewed under ambient light and/or non-visible radiation can be produced from a common colorant-containing fluid set.

Example 10

Preparation of Colorant-Containing Fluids Visible Under Ambient Light and Non-Visible Radiation A colorant-containing fluid as in Example 1, 2, or 3 is admixed with from 0.1 wt % to 6 wt % of a pigment or a dye that is visible under ambient light so that the colorant-containing fluid is visible under ambient light, and under non-visible light.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A set of colorants, comprising:
a first colorant capable of absorbing non-visible radiation and shifting the wavelength of said non-visible radiation to a first visible wavelength; and
a second colorant capable of absorbing the non-visible radiation and shifting the wavelength of said non-visible radiation to a second visible wavelength;
wherein the first visible wavelength and the second visible wavelength are two different hues, and wherein upon printing, the set of colorants render a multi-colored image when viewed under non-visible radiation outside of the visible spectrum.

2. The set of colorants of claim 1, wherein the non-visible radiation is ultra violet radiation.

3. The set of colorants of claim 1, wherein the non-visible radiation is infrared radiation.

4. The set of colorants of claim 1, wherein at least one of the first visible wavelength and the second visible wavelength is red, green or blue.

5. The set of colorants of claim 1, wherein the both first visible wavelength and the second visible wavelength are independently red, green, or blue.

6. The set of colorants of claim 1, further comprising a third colorant capable of absorbing the non-visible radiation and shifting the wavelength of said non-visible radiation to a third visible wavelength, wherein the third visible wavelength is a different hue from the first visible wavelength and the second visible wavelength.

7. The set of colorants of claim 6, wherein the first visible wavelength is red, the second visible wavelength is green, and the third visible wavelength is blue.

8. The set of colorants of claim 6, wherein the first visible wavelength, the second visible wavelength, and the third visible wavelength combine to emit a perceptibly full color image under the non-visible radiation.

9. The set of colorants of claim 1, wherein the first colorant and the second colorant are configured for ink-jet printing, liquid toner printing, dry toner printing, electrophotography printing, liquid electrophotography printing, dye sublimation printing, analog offset printing, Indigo printing, or reflective e-paper printing.

10. The set of colorants of claim 1, wherein the colorant is a pigment.

11. The set of colorants of claim 1, further including a colorant which reflects visible light radiation to produce a visible light-reflected hue.

12. The set of colorants of claim 11, wherein the colorant is a dye or a pigment.

13. The set of colorants of claim 11, wherein the visible light-reflected hue is selected from the group consisting of cyan, magenta, yellow, and black.

* * * * *